3,511,493
CAMBER CHANGE AND ROLL STEER INDUCING LEAF SPRING SUSPENSION
Frank C. Burrell, Orchard Lake, Mich., assignor to General Motors Corporation, Detroit, Mich., a corporation of Delaware
Filed Oct. 23, 1967, Ser. No. 677,371
Int. Cl. F16f 1/28; B60g 11/04
U.S. Cl. 263—47     8 Claims

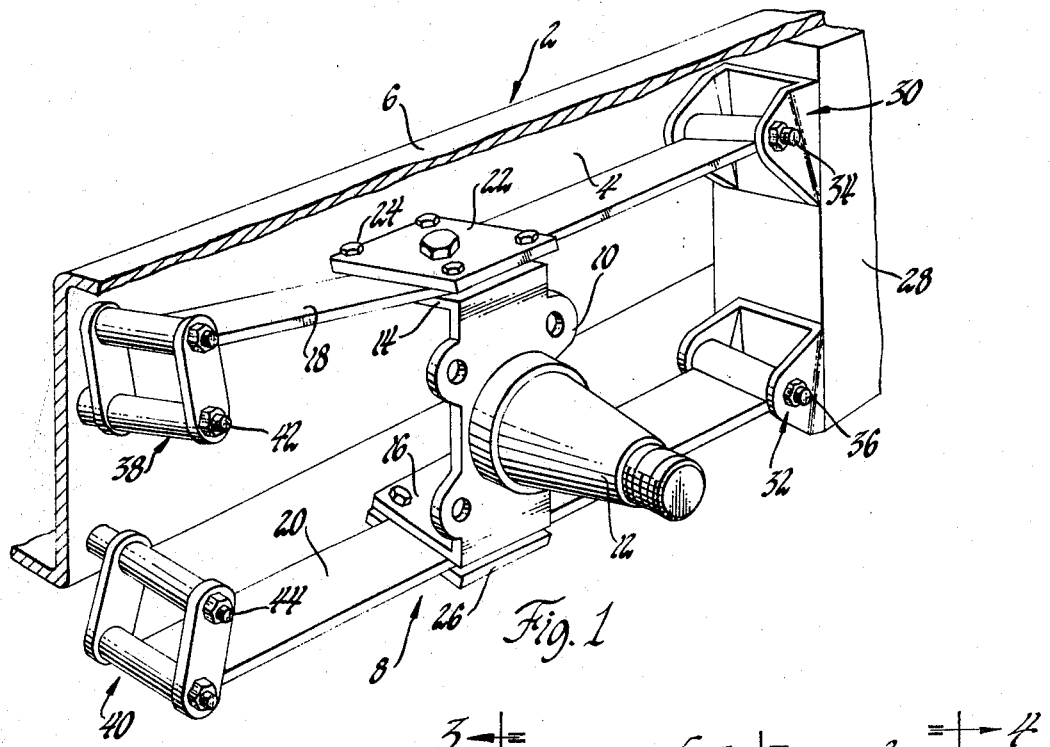
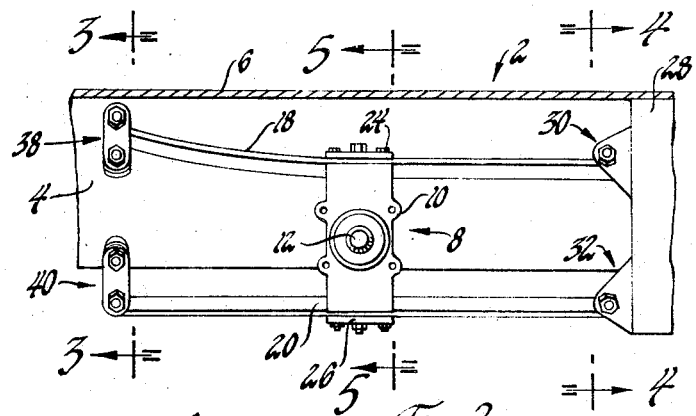
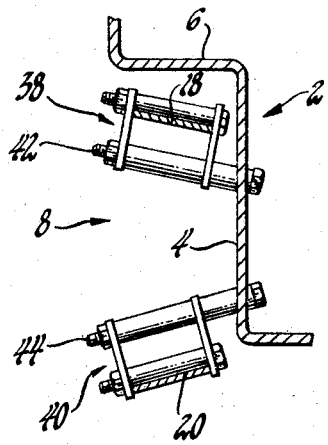
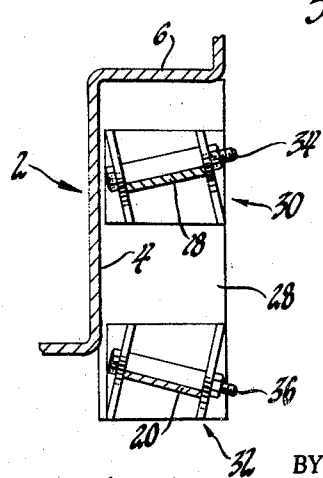
Fig. 1
Fig. 2
Fig. 3
Fig. 4
INVENTOR.
Frank C. Burrell
BY
W. F. Wagner
ATTORNEY INVENTOR.
Frank C. Burrell
BY
ATTORNEY

United States Patent Office 3,511,493
Patented May 12, 1970

ABSTRACT OF THE DISCLOSURE

A pair of vertically spaced longitudinally extending leaf springs are pivotally connected to a vehicle sprung mass on fore and aft axes converging vertically toward the vehicle centerline to induce camber change in a wheel rotatably mounted between the respective midportions of the springs. The springs are additionally relatively inclined longitudinally to impart understeer responsive to vehicle roll deflection.

---

The present invention relates to independent wheel suspension of the type in which leaf springs constitute both the elastic medium and the sole means for orienting and guiding the wheels during deflection.

It has previously been proposed in the prior art to mount vehicle wheels on a spindle support structure which is secured to the vehicle superstructure by vertically spaced longitudinally extending leaf springs. In typical prior art structures, such as for example U.S. Pat. No. 2,466,832—Wallace, the arrangements are such as to provide for essentially rectilinear deflection movement of the associated wheel. In contrast, the present invention is directed to an arrangement enabling introduction of a predetermined rate of camber change as an incidence of deflection, as well as providing for wheel motion along a longitudinally inclined path effective to induce geometric roll understeer.

The foregoing and other objects, advantages and features of the invention will become more readily apparent as reference is had to the accompanying specification and drawings wherein:

FIG. 1 is a fragmentary view of a portion of the vehicle chassis illustrating in perspective the form and arrangement of a leaf spring suspension construction in accordance with the invention;

FIG. 2 is a side elevational view of the construction shown in FIG. 1;

FIG. 3 is a view looking in the direction of arrows 3—3 of FIG. 2;

FIG. 4 is a view looking in the direction of arrows 4—4 of FIG. 2;

Figure 5:
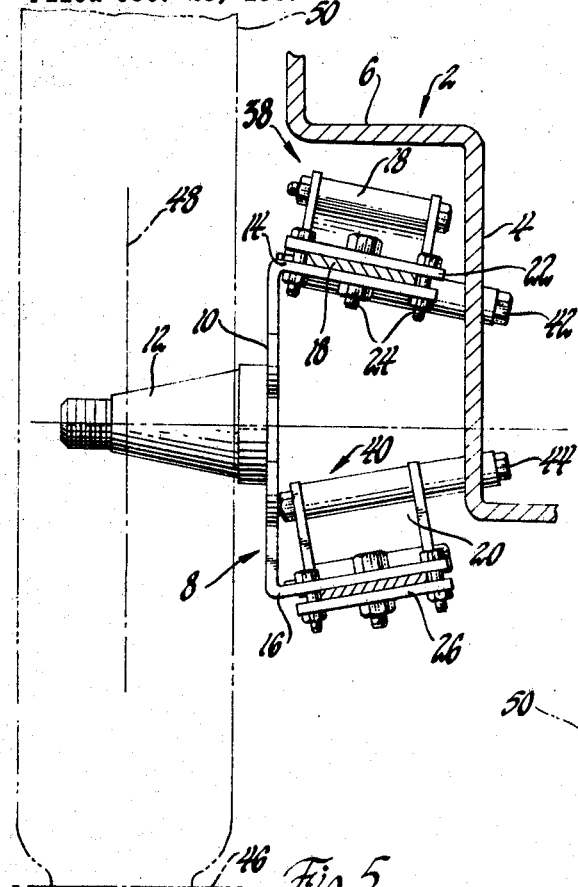
FIG. 5 is an end elevational view, partly in section, illustrating the relationship of the suspension and associated wheel when the supported portion of the vehicle is at design height.

Referring now to the drawings and particularly FIG. 1, reference numeral 2 generally designates the frame side rail portion of a vehicle sprung mass. Rail 2 includes a vertical wall portion 4 and a top wall portion 6, the latter of which overlies a parallel leaf spring suspension assembly 8. Suspension assembly 8 comprises a wheel spindle support 10 having wheel spindle 12 extending laterally outwardly therefrom. At its upper and lower extremities, support 10 is provided with laterally inwardly directed projections 14 and 16 which respectively underlie and overlie adjacent surfaces of a longitudinally extending upper leaf spring 18 and a longitudinally extending lower leaf spring 20. Overlying spring 18 in vertical registration with projection 14 is a clamp plate 22 which, when bolted to projection 14 by bolts 24, secures the central portion of spring 18 with the upper end of spindle support 10. A similar clamp plate 26 underlies lower spring 20 in registration with projection 16 and cooperates therewith to secure the spring 20 to the lower end of spindle support 10.

In accordance with one feature of the invention, the forward extremities of both springs 18 and 20 are connected to an abutment 28 on side rail 2 by pivot connections 30 and 32, the axes 34 and 36 of which are oppositely inclined as viewed in end elevation so as to converge in the direction of the vehicle centerline, not shown. The rearward ends of springs 18 and 20 in turn are connected to the side rail 2 by shackle assemblies 38 and 40, the fixed axes 42 and 44 of which similarly converge in the direction of the vehicle centerline.

Figure 6:
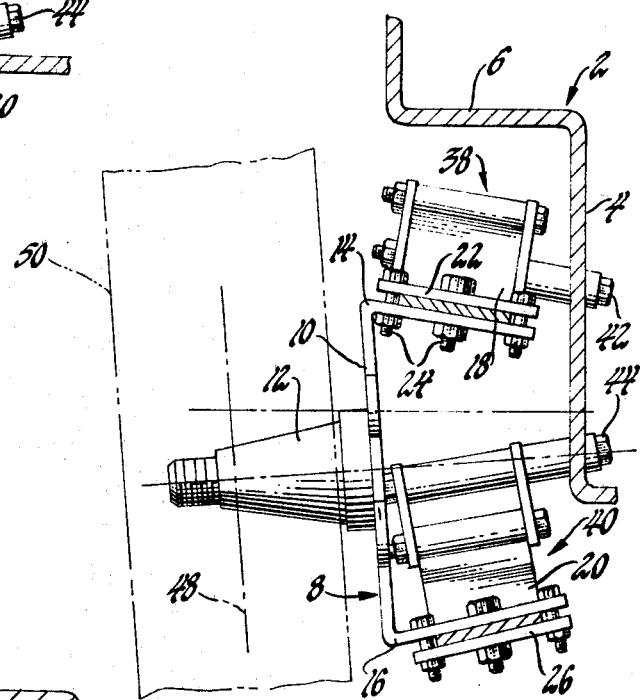
FIG. 6 is a view illustrating the camber change occurring as the wheel moves in the rebound direction.
Figure 7:
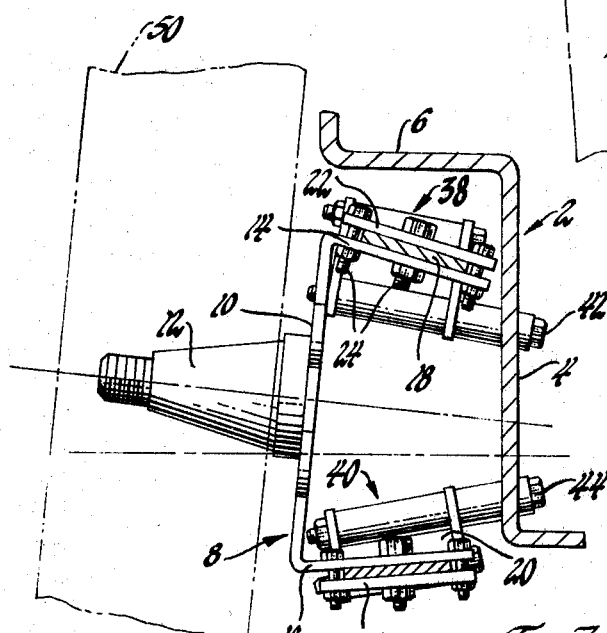
FIG. 7 is a view similar to FIG. 6 illustrating the camber change resulting from compression deflection of the wheel.

When constructed and arranged in the manner illustrated and described, the suspension assembly of FIG. 1 not only provides an independent wheel suspension in which the leaf springs provide both the elastic medium and the geometric control elements, but additionally, augment the geometric control by enabling introduction of a controlled degree of wheel camber change throughout the range of vertical wheel deflection. As seen best in FIG. 5, when the supported portion of the vehicle, not shown, to which the side rail 2 is attached, is at the normal design height, the wheel spindle 12 extends laterally outwardly parallel with the ground 46 so that the plane of rotation 48 of the wheel 50 is perpendicular to the ground. However, during rising and falling movement of the wheel relative to the side rail 2, the converging inclinations of the pivotal connections for the leaf springs cause the leaf springs to deflect in planes normal to the respective forward and rearward pivotal connections. In consequence, the wheel spindle 12 describes an angular path generated from a point corresponding approximately to the plane of intersection of the inclined pivot. Therefore, as the wheel 12 moves downwardly as in FIG. 6, the wheel exhibits a progressively increasing negative camber relative to the ground, while rising movement of the wheel from design height, as illustrated in FIG. 7, causes the wheel to exhibit a progressively increasing positive camber angle relative to the ground.

According to another feature of the invention, as seen best in FIG. 2, the shackle assemblies 38 and 40 are arranged in vertically spaced relation on side rail 2 so that the effective plane of the upper leaf 18 slopes downwardly toward the front of the vehicle while the effective plane of the lower leaf spring is essentially horizontal. Since the upper end of the spindle support 10 is constrained to follow the deflection path of the central portion of leaf spring 18 while the lower end of the spindle support similarly follows the deflection path of the central portion of the lower leaf spring, simultaneous upward deflection of both leaves induces a forward component of movement in wheel spindle 12. Naturally, the converse is true for downward displacement of the wheel spindle support. Therefore, under conditions of roll deflection of the sprung mass, the wheel on the outboard side of the vehicle will move forwardly while the wheel on the inboard side will move rearwardly thus causing a predetermined degree of roll understeer.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a motor vehicle, a sprung mass, a pair of longitudinally extending leaf springs pivotally connected to said sprung mass at one of their ends on vertically spaced transversely inwardly converging pivot axes, a wheel spindle support extending vertically between and connected to said leaf springs midway thereof, and a pair of vertically spaced shackle members connecting the opposite ends of said springs to said sprung mass, said shackle members defining inwardly converging axes of motion.

2. The invention of claim 1 wherein said pivot axes are at corresponding ends of said springs.

3. The invention of claim 1 wherein the effective planes of said springs are longitudinally non-parallel.

4. The invention of claim 1 wherein each of said shackle members includes a pair of vertically spaced pivot axes connected respectively to said sprung mass and the associated leaf spring.

5. The invention of claim 4 wherein at least one of each of said last mentioned pairs of pivot axes is inclined transversely at an angle corresponding to the angle of inclination of said pivot axis connecting the other end of the associated spring to said sprung mass.

6. The invention of claim 3 wherein the effective planes of said springs diverge rearwardly.

7. The invention of claim 6 wherein the effective planes of one of said springs is horizontal.

8. The invention of claim 7 wherein one of said shackle members is loaded in compression and the other in tension.

References Cited

UNITED STATES PATENTS

| | | | |
|---|---|---|---|
| 2,466,832 | 4/1949 | Wallace | 280—124 |
| 3,377,060 | 4/1968 | Sherwood | 267—47 |

JAMES B. MARBERT, Primary Examiner

U.S. Cl. X.R.

280—124